Dec. 4, 1934.  S. M. MORIYA  1,983,142
COFFEE BAG
Filed Sept. 23, 1932
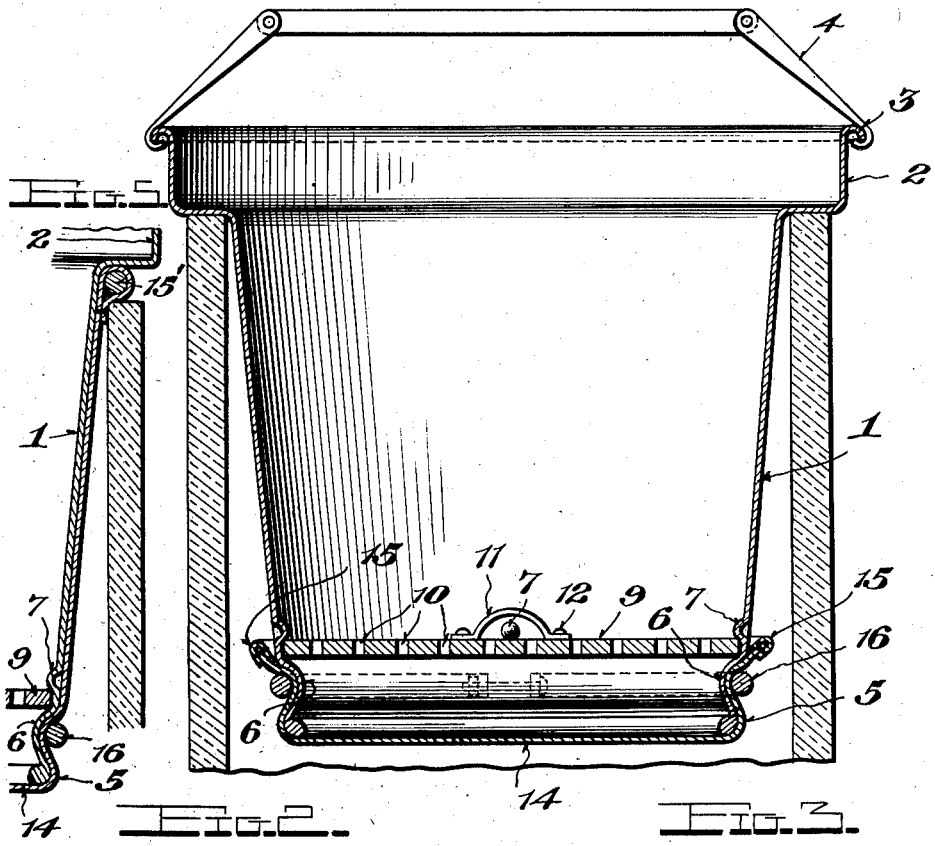
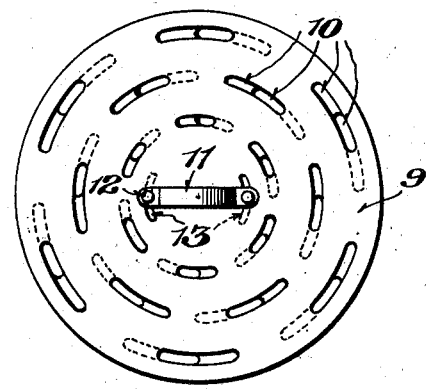
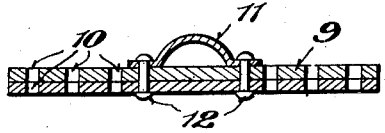
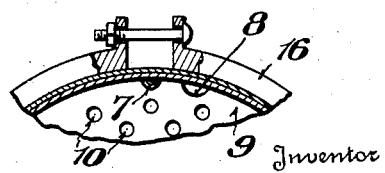
Inventor
*Saburo M. Moriya,*
By *Donald L. Mapson.*
Attorney Patented Dec. 4, 1934

1,983,142

UNITED STATES PATENT OFFICE 1,983,142

COFFEE BAG

Saburo M. Moriya, Arden, Del.

Application September 23, 1932, Serial No. 634,583

2 Claims. (Cl. 53—3)

This invention relates to improvements in coffee bags, and more particularly to a metal coffee bag which may be used in any desired type of coffee urn or pot, and which will be so constructed that all of the water poured in the bag will pass through the coffee instead of a portion of the water escaping through the sides of the bag directly into the bottom of the urn or pot as is the case with most types of coffee bags.

An object of the invention is to provide an improved steel or metal coffee bag, or from any desired material which does not react with coffee, which will be so constructed that there will be absolutely no side seepage of the water into the coffee urn or pot.

Another object of the invention is to provide an improved metal coffee bag which will be so constructed that the bottom of the bag will be reinforced and will be adapted to receive the filter cloth having an edge binding over the open bottom of the bag, and will be supported in position thereon by a suitable external clamping ring or band.

A further object of the invention is to provide an improved metal coffee bag which will preferably be made from stainless steel or acid resisting material, comprising a tapered shell having an enlarged annular supporting flange at its upper end and a reinforcing bead annularly disposed about its lower end, together with an annular seat or groove adjacent the lower end adapted to receive the fastening ring or band for holding the filter cloth on the bottom of the bag, and an imperforate plug water deflector adapted to seat within the bag on the annular groove, and to be locked in place by means of the inwardly directed humps in the bag which cooperate with the notches in the edge of the plug.

Another object of this invention is to provide a regulated space where coffee grounds can form a filter. If swelling coffee is compressed it will clarify and filter any coffee that passes through, at the same time, extracting coffee from the coffee grounds which form this filter.

Another object of this invention is to elevate this bag as high out of the crock as possible so as not to allow the coffee grounds to be immersed in the coffee, especially if it is not withdrawn quickly.

A further object of this invention is to provide a tapered shell having a reinforced bead annularly disposed about its lower end, which can be used in a regular coffee bag and is held in place by means of an annular seat or groove adjacent to its lower end, adapted to receive a fastening, ring, or band.

Other objects will appear as the description proceeds.

In the accompanying drawing which forms a part of my application,

Figure 1 is a vertical sectional view of my improved metal coffee bag showing the same in operative position within an urn, and showing the detachable bag removing handle in engagement with the annular rim about the top of the bag;

Figure 2 is a plan view of my improved plug water deflector showing the adjustable perforations formed therein;

Figure 3 is a transverse sectional view through the plug, and

Figure 4 is a detail view showing the clamping ring or band used to hold the filter cloth in position on my improved coffee bag, Figure 5 is a vertical sectional view of an improved metal shell showing same in operative position within a coffee bag, held in place with the clamping ring or band.

Like characters of reference are used throughout the following specification and the accompanying drawing to designate corresponding parts.

In carrying out my invention, I provide a cylindrical tapered metal shell 1 having an enlarged annular supporting flange 2 at its upper end, which in turn terminates in an annular downwardly extending groove 3, adapted to be engaged by a removable hooked handle 4, as illustrated in Figure 1 of the drawing. The lower or bottom end of the shell 1 is formed with an annular reinforcing bead 5, and adjacent thereto, the shell 1 is formed with an inwardly directed annular seat or groove 6, the purpose of which will be hereinafter described. A plurality of spaced inwardly directed locking tits or humps 7 are formed in and about the lower portion of the shell 1, and cooperate with a corresponding number of edge notches 8 in the removable water spreading and deflecting plug 9, which when in position seats on the inwardly extending groove or seat 6.

My improved water spreading and deflecting plug 9 consists of either a single perforated plate, as shown in Figure 1 of the drawing, or the preferred form comprises two plates provided with elongated slots or perforations 10, adapted to register one with the other, so that when the plates are rotated with respect to each other the size of the openings may be varied at will to permit more or less water to pass therethrough during a given time. A handle 11 is secured to the plates by means of the pins or rivets 12, which operate in the curved adjusting slots 13 formed in the plates.

It is my intention to use a filter cloth 14 provided with an edge binding 15, and in use this cloth will be placed over the lower end of the shell 1 and will be held tightly thereon by the adjustable clamping ring or band 16 which will seat in the annular groove 6 formed in the said shell.

From the foregoing description and drawing, it will be apparent that the annular supporting flange on the shell provides for easy and efficient placing of the bag within the urn, and the handle provided for removing the bag from the urn insures the quick removal of the bag without the danger of scalding or burning the hands, as is often the case when the old type coffee bags are removed.

In Figure 5, the showing discloses my improved metal coffee bag positioned within a filter bag which extends up the entire length of the coffee bag, and is supported on the top of the crock by means of the supporting ring 15' within the hem formed at the top of the filter bag.

Having thus described my invention what I claim as new and desire to secure by Letters Patent of the United States is:

1. A metal coffee bag comprising a tapered metal shell having an enlarged annular supporting flange about its upper end and terminating in a downwardly extending annular groove, a reinforcing bead formed about the lower end of said shell, an annular inwardly directed seat formed in the shell adjacent said reinforcing bead, a filter cloth having an edge binding adapted to be received over the lower open end of said shell, an adjustable clamping band engageable with the filter cloth and adapted to be received within the seat, and a removable perforated plug water deflector and spreader adapted to be placed within said shell and to seat on the annular seat formed adjacent the bottom of the shell.

2. A tapered metal coffee bag having an enlarged annular supporting flange formed about its upper end and a reinforcing bead about its lower end, a filter bag removably positioned about said metal coffee bag and supported by means of an annular supporting ring housed within a hem formed at the top of the filter bag, said ring seating on the top of a crock of a coffee urn in contact with the under surface of the annular flange, and a removable perforated water deflecting plug in said bag.

SABURO M. MORIYA.